(12) United States Patent
Little et al.

(10) Patent No.: US 8,292,516 B2
(45) Date of Patent: Oct. 23, 2012

(54) OPTOELECTRONIC CABLE ASSEMBLY HAVING MOVEABLE OPTICAL MODULE

(75) Inventors: Terrance F. Little, York, PA (US); Tod M. Harlan, Mechanicsburg, PA (US)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 294 days.

(21) Appl. No.: 12/688,835

(22) Filed: Jan. 15, 2010

(65) Prior Publication Data

US 2011/0176778 A1 Jul. 21, 2011

(51) Int. Cl.
*G02B 6/36* (2006.01)
(52) U.S. Cl. ......................................................... 385/76
(58) Field of Classification Search ........................ None
See application file for complete search history.

(56) References Cited

U.S. PATENT DOCUMENTS

| | | | |
|---|---|---|---|
| 7,021,971 B2 | 4/2006 | Chou et al. | |
| 7,104,848 B1 | 9/2006 | Chou et al. | |
| 7,380,991 B2 | 6/2008 | Schempp | |
| 7,572,071 B1* | 8/2009 | Wu | 385/94 |
| 7,896,559 B2* | 3/2011 | Yi et al. | 385/75 |
| 2010/0111476 A1* | 5/2010 | Shirk et al. | 385/53 |
| 2010/0158448 A1* | 6/2010 | Yi et al. | 385/74 |
| 2010/0158449 A1* | 6/2010 | Yi | 385/75 |
| 2011/0158591 A1* | 6/2011 | Harlan | 385/77 |
| 2011/0194824 A1* | 8/2011 | Andrews | 385/93 |
| 2011/0311188 A1* | 12/2011 | Wang et al. | 385/94 |

* cited by examiner

*Primary Examiner* — Sung Pak
(74) *Attorney, Agent, or Firm* — Wei Te Chung; Ming Chieh Chang

(57) ABSTRACT

An optoelectronic cable assembly (100) includes an insulative housing (2), a set of contacts (3) retained in the housing, an optical module (5) movably retained to the housing and at least one fiber optic coupled (6) to the optical module. The housing defines a base portion (21) and an extending portion (22) extending forwards from the base portion. The set of contacts each defines a retention portion (31) retained in the base portion, an elastic arm (32) running through the extending portion and exposed beyond the extending portion and a tail portion (33) extending out of the base portion. The optical module is disposed in front of the extending portion to receive the elastic arms therein, and is capable of moving along a front-to-back direction with regard to the extending portion. The optical module is moveable with regard to the extending portion, which can be accurately aligned with.

20 Claims, 18 Drawing Sheets

OPTOELECTRONIC CABLE ASSEMBLY HAVING MOVEABLE OPTICAL MODULE

CROSS-REFERENCE TO RELATED APPLICATIONS

This application is related to U.S. patent application Ser. No. 11/818,100, filed on Jun. 13, 2007 and entitled "EXTENSION TO UNIVERSAL SERIAL BUS CONNECTOR WITH IMPROVED CONTACT ARRANGEMENT"; U.S. patent application Ser. No. 11/982,660, filed on Nov. 2, 2007 and entitled "EXTENSION TO ELECTRICAL CONNECTOR WITH IMPROVED CONTACT ARRANGEMENT AND METHOD OF ASSEMBLING THE SAME"; U.S. patent application Ser. No. 11/985,676, filed on Nov. 16, 2007 and entitled "ELECTRICAL CONNECTOR WITH IMPROVED WIRE TERMINATION"; U.S. patent application Ser. No. 12/626,632 filed on Nov. 26, 2009 and entitled "CABLE ASSEMBLY HAVING POSITIONING MEANS SECURING FIBER THEREOF"; U.S. patent application Ser. No. 12/626,631 filed Nov. 26, 2009 and entitled "CABLE ASSEMBLY HAVING POSITIONING MEANS SECURING FIBER THEREOF"; U.S. patent application Ser. No. 12/636,774 filed Dec. 13, 2009 and entitled "CABLE ASSEMBLY HAVING FLOATABLE OPTICAL MODULE"; U.S. patent application Ser. No. 12/636,775 file Dec. 13, 2009 and entitled "CABLE ASSEMBLY HAVING FLOATABLE OPTICAL MODULE"; U.S. patent application Ser. No. 12/647,411 field Dec. 25, 2009 and entitled "CABLE ASSEMBLY HAVING FLOATABLE OPTICAL MODULE"; and U.S. patent application Ser. No. 12/647,412 filed Dec. 25, 2009 and entitled "CABLE ASSEMBLY HAVING FLOATABLE OPTICAL MODULE", all of which have the same assignee as the present invention.

BACKGROUND OF THE INVENTION

1. Field of the Invention

The present invention relates to an optoelectronic cable assembly, and more particularly to an optoelectronic cable assembly incorporating with a mating element slidably disposed therein.

2. Description of the Related Art

Recently, personal computers (PC) uses of a variety of techniques for providing input and output. Universal Serial Bus (USB) is a serial bus standard to the PC architecture with a focus on computer telephony interface, consumer and productivity applications. The design of USB is standardized by the USB Implementers Forum (USB-IF), which is an industry standard body incorporating leading companies from the computer and electronic industries. In USB interface has been widely applied to interconnect peripherals such as mouse devices, keyboards, PDAs, gamepads and joysticks, scanners, digital cameras, printers, external storage, networking components, etc. For many devices such as scanners and digital cameras, USB has become the interconnection interface.

USB supports three data rates: 1) A Low Speed rate of up to 1.5 Mbit/s (187.5 KB/s) that is mostly used for Human Interface Devices (HID) such as keyboards, mice, and joysticks; 2) A Full Speed rate of up to 12 Mbit/s (1.5 MB/s). Full Speed was the fastest rate before the USB 2.0 specification and many devices fall back to Full Speed. Full Speed devices divide the USB bandwidth between them in a first-come first-served basis and it is not uncommon to run out of bandwidth with several isochronous devices. All USB Hubs support Full Speed; 3) A Hi-Speed rate of up to 480 Mbit/s (60 MB/s). Though Hi-Speed devices are advertised as "up to 480 Mbit/s", not all USB 2.0 devices are Hi-Speed. Hi-Speed devices typically only operate at half of the full theoretical (60 MB/s) data throughput rate. Most Hi-Speed USB devices typically operate at much slower speeds, often about 3 MB/s overall, sometimes up to 10-20 MB/s. A data transmission rate at 20 MB/s is sufficient for some but not all applications. However, under a circumstance transmitting an audio or video file, which is always up to hundreds MB, even to 1 or 2 GB, currently transmission rate of USB is not sufficient. As a consequence, faster serial-bus interfaces are being introduced to address different requirements. PCI Express, at 2.5 GB/s, and SATA, at 1.5 GB/s and 3.0 GB/s, are two examples of High-Speed serial bus interfaces.

From an electrical standpoint, the higher data transmission rates of the non-USB protocols discussed above are highly desirable for certain applications. However, these non-USB protocols are not used as broadly as USB protocols. Many portable devices are equipped with USB interfaces other than these non-USB interfaces. One of the important reason is that these non-USB connectors contain a greater number of signal pins than an existing USB interface and are physically larger as well. For example, while the PCI Express is useful for its higher possible transmission rates, the 26-pin connector renders a wider card-like form factor limit the use of Express Cards. For another example, SATA uses two connectors, one 7-pin connector for signals and another 15-pin connector for power. In essence, SATA is more useful for internal storage expansion than for external peripherals.

The existing USB connectors have a small dimension but lower transmission rate, while other non-USB connectors (PCI Express, SATA, et al) have a high transmission rate but large bulky. Neither of them can be desirably and properly implemented into modern high-speed, miniaturized electronic devices and peripherals. To provide a connector with a small bulky and a high transmission rate for portability and high data transmitting efficiency is much more desirable.

In recent years, more and more electronic devices are adopted for optical data transmission. It may be a good idea to design a connector which is capable of transmitting both an electrical signal and an optical signal. Design concepts are already common for such a optoelectronic connector which is compatible of electrical and optical signal transmission. The connector includes metallic contacts assembled to an insulated housing and several optical lenses bundled together and mounted to the housing also. A hybrid cable configured with wires and optical fibers that are respectively attached to the metallic contacts and the optical lenses.

However, optical lenses are unable to be movably with regard to the housing. They are not accurately aligned with, and optically coupled to counterparts, if there are some errors in manufacturing process.

SUMMARY OF THE INVENTION

An object of the present invention is to provide an optoelectronic cable assembly has a moveable optical module.

In order to achieve the above-mentioned object, an optoelectronic cable assembly in accordance with present invention includes an insulative housing, a set of contacts retained in the housing, an optical module retained to the housing and at least one fiber optic coupled to the optical module. The housing defines a base portion and an extending portion extending forwards from the base portion. The set of contacts each defines a retention portion retained in the base portion, an elastic arm running through the extending portion and exposed beyond the extending portion and a tail portion extending out of the base portion. The optical module is disposed in front of the extending portion to receive the elastic arms therein, and is capable of moving along a front-to-back direction with regard to the extending portion.

Other objects, advantages and novel features of the invention will become more apparent from the following detailed description of the present embodiment when taken in conjunction with the accompanying drawings.

DETAILED DESCRIPTION OF THE INVENTION

Figure 1:
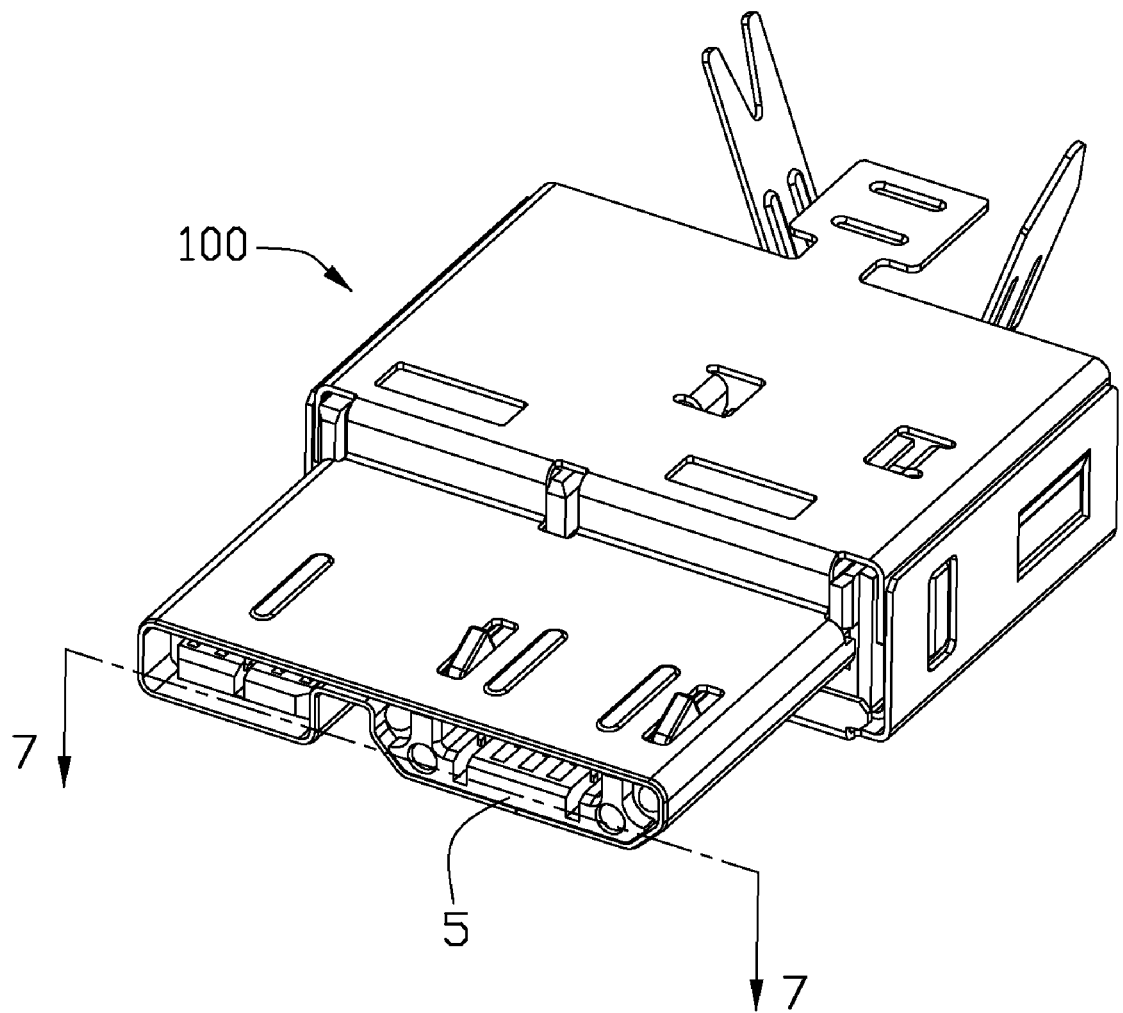
FIG. 1 is an assembled, perspective view of an optoelectronic cable assembly in accordance with the present invention.

Reference will now be made to the drawing figures to describe the preferred embodiments of the present invention in detail.

Figure 2:
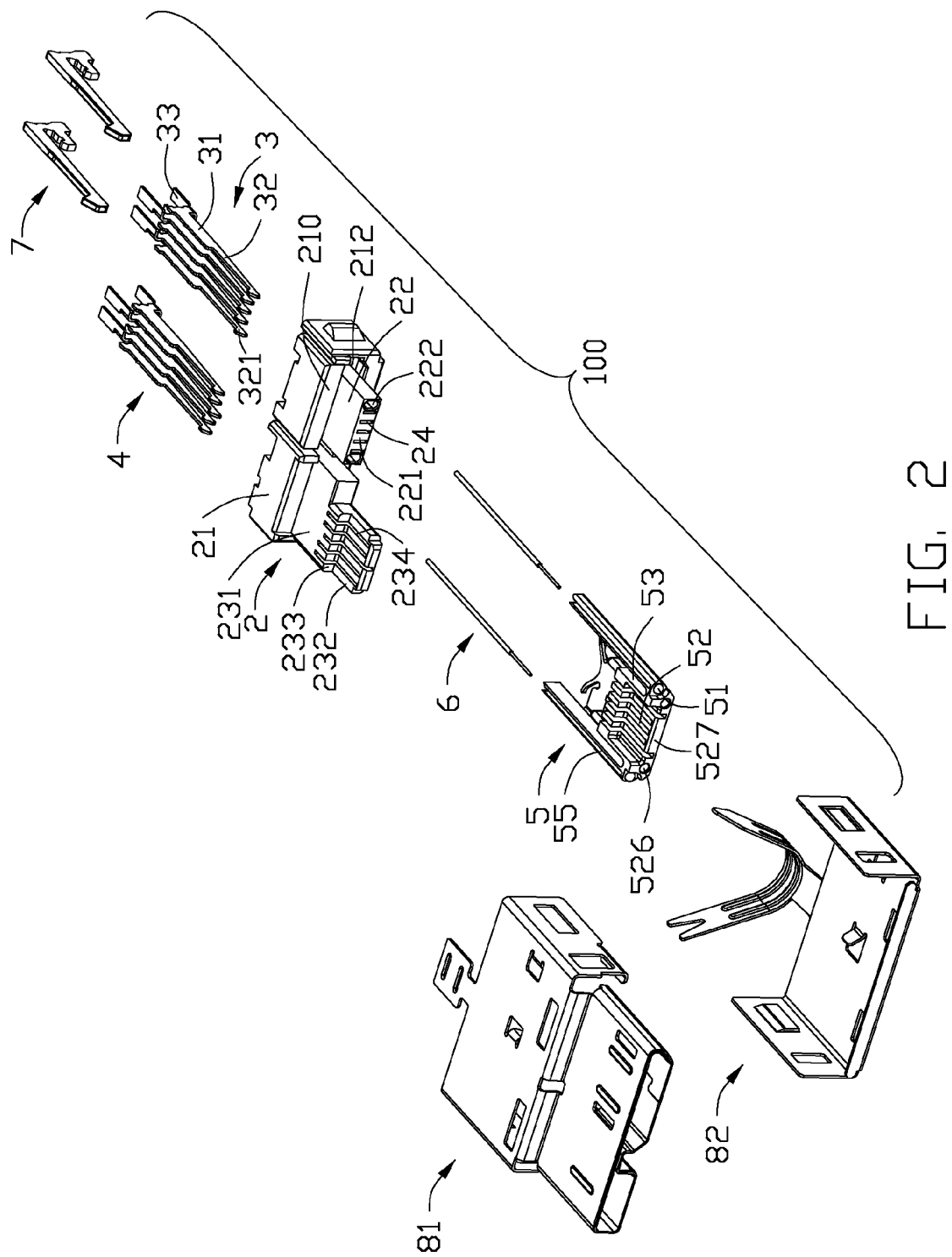
FIGS. 2-4 are three different exploded perspective views of the optoelectronic cable assembly shown in FIG. 1.
Figure 3:
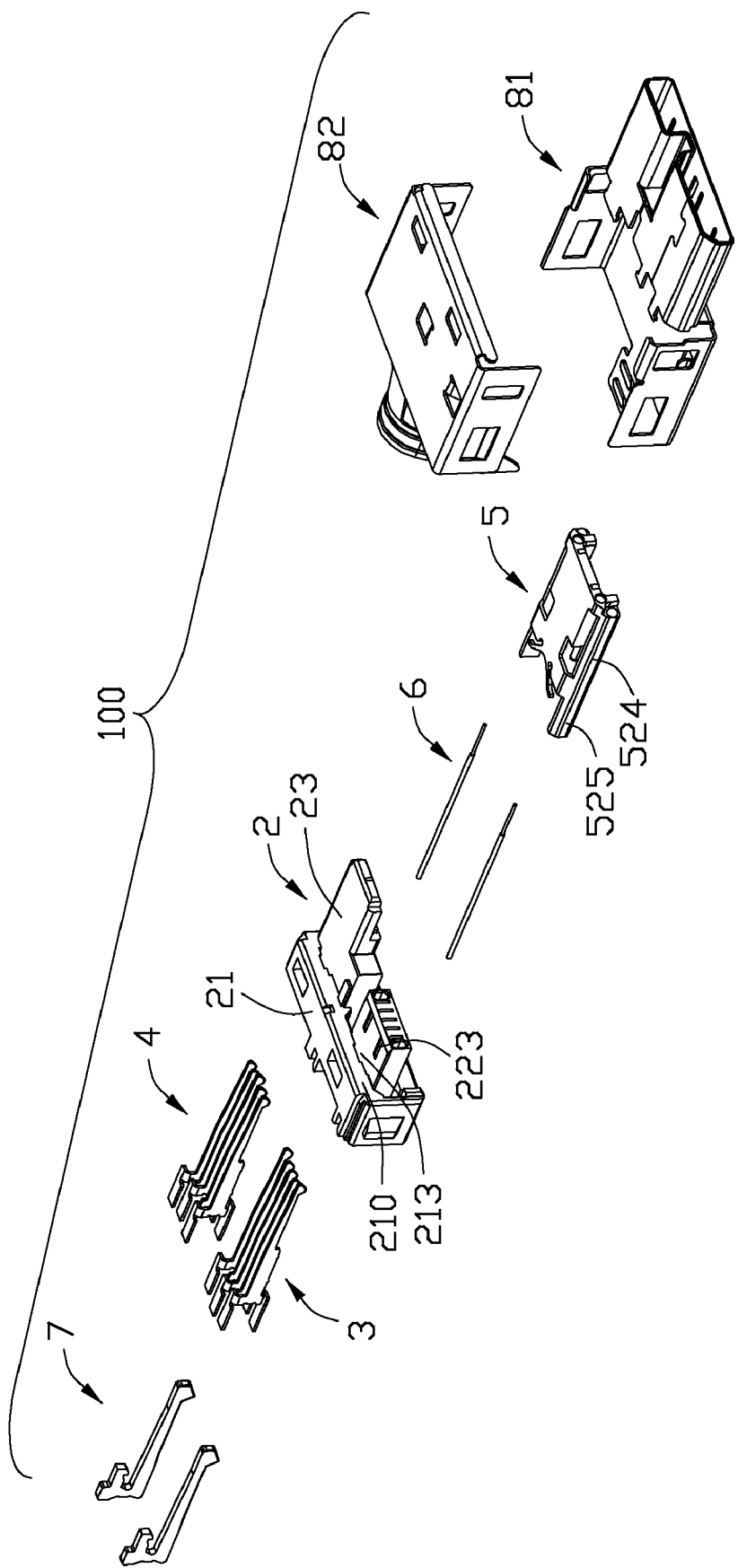
Figure 4:
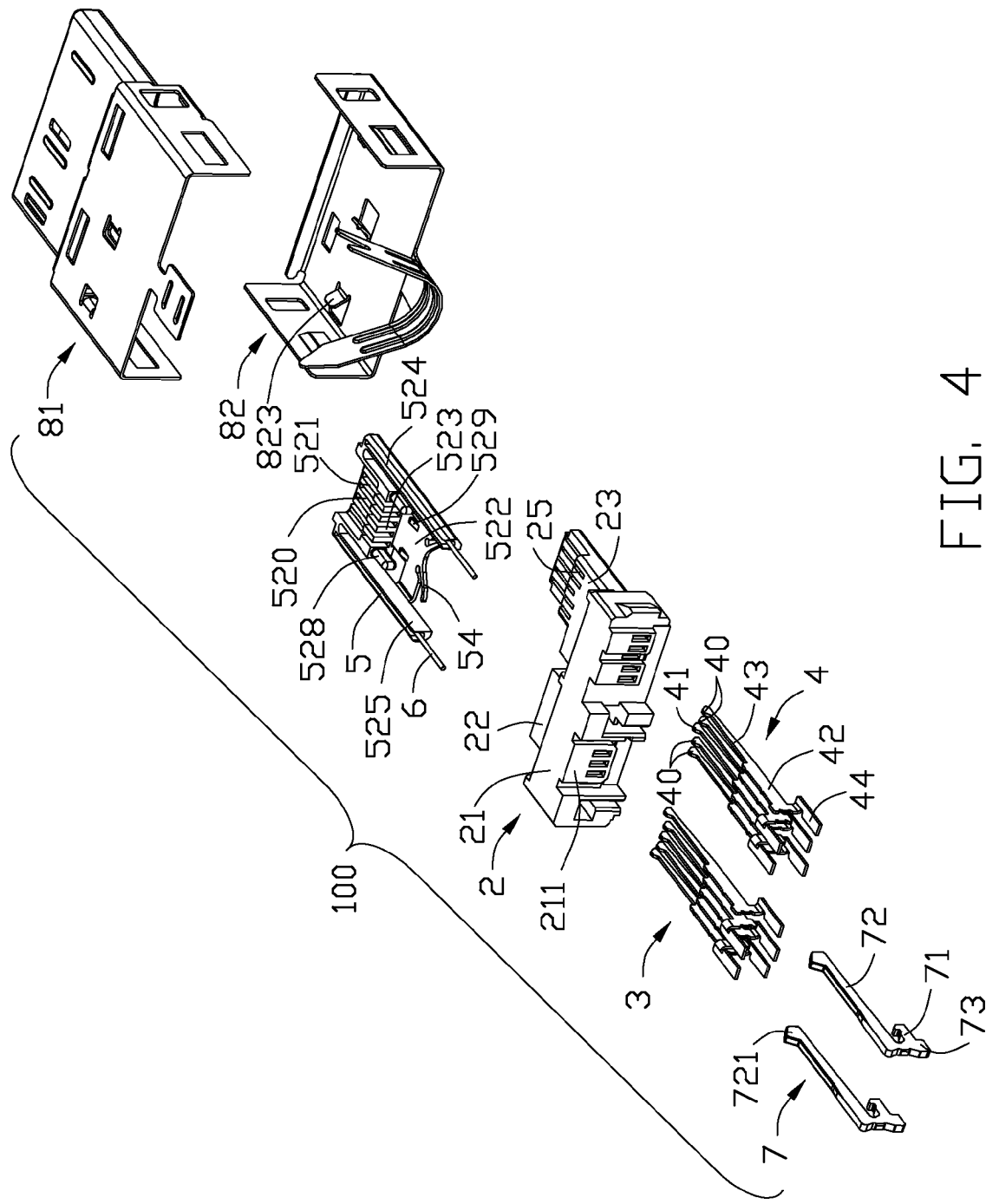
Figure 5:
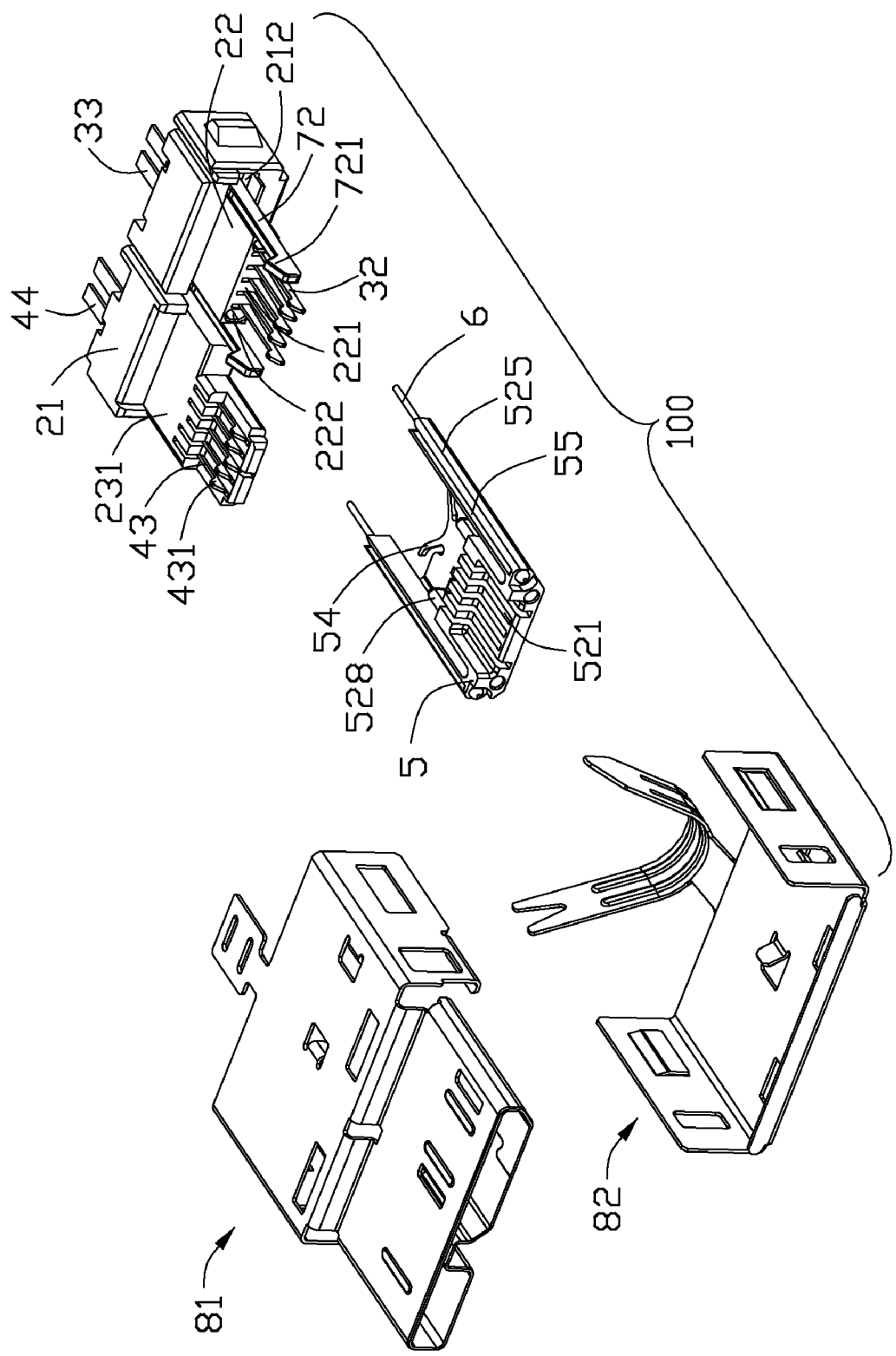
FIG. 5 is a partly exploded perspective view of the optoelectronic cable assembly and shows an optical module, a first shield part and a second shield part separated from an housing shown in FIG. 1.
Figure 6:
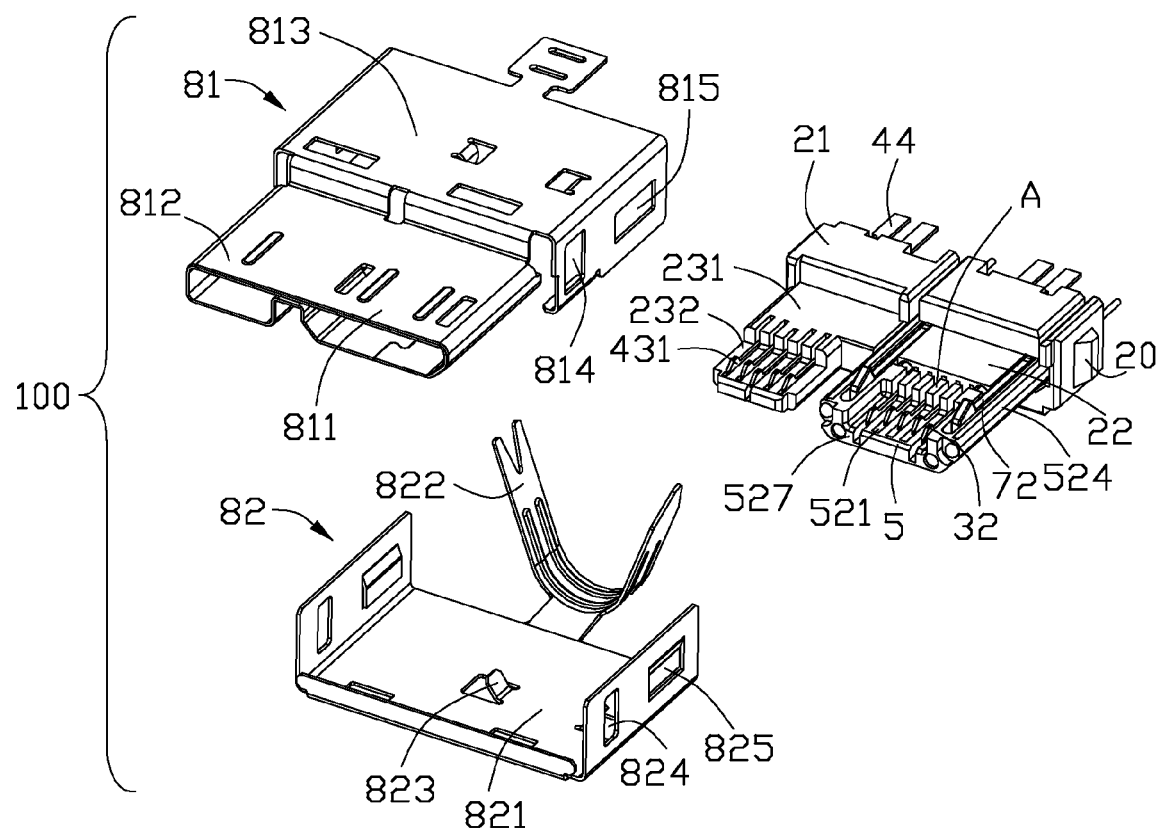
FIG. 6 is a partly exploded perspective view of the optoelectronic cable assembly and shows the optical module assembled to the housing shown in FIG. 5.
Figure 7:
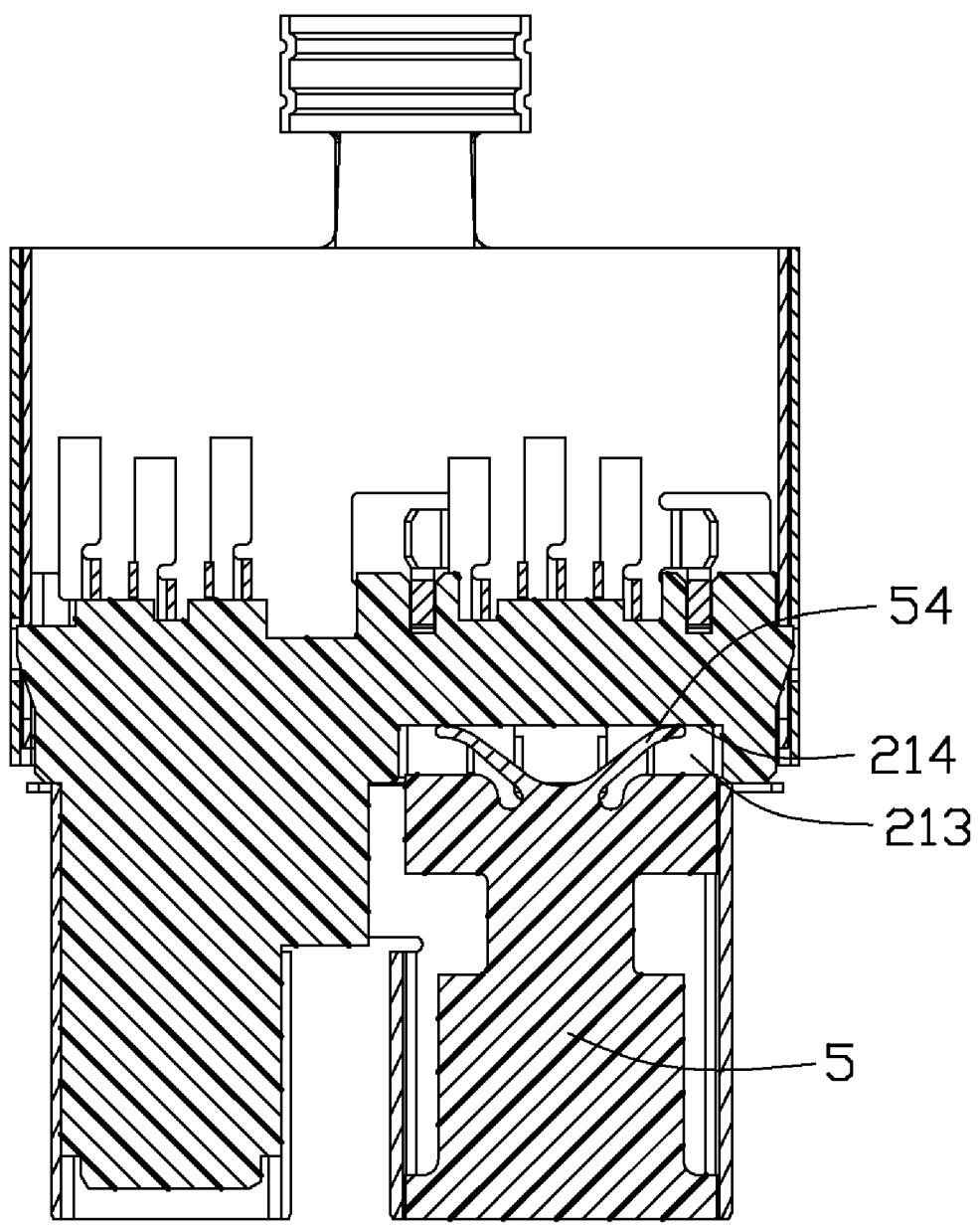
FIG. 7 is a cross sectional view taken along line 7-7 of FIG. 1, and shows spring arms of the optical module situated in a non-mating state.

Referring to FIG. 1 and FIG. 2, an optoelectronic cable assembly 100 according to the present invention is disclosed. The optoelectronic cable assembly 100 includes an insulative housing 2, a set of first contacts 3, a set of second contacts 4, an optical modules 5 movably assembled to the insulative housing 2, two fibers optic 6 coupled to the optical module 5, a pair of latching member 7 disposed at the housing 2, and a metal shell surrounding the housing 2.

Referring to FIG. 2 to FIG. 4 and FIG. 7, the housing 2 defines a base portion 21, an extending portion 22 integrally and forwardly extending from a front face 210 of the base portion and a tongue portion 23 integrally extending parallel to the extending portion 22 from the front face 210. The extending portion 22 and the tongue portion 23 are disposed side-by-side and in parallel to each other. The tongue portion 23 defines a supporting portion 231 and a mating portion 232 extending forwardly from the supporting portion 231. A plurality of first receiving grooves 24 run through a front face 221 of the extending portion 22 from a rear face 211 of the base portion 21 in a front-to-back direction. A plurality of second receiving grooves 25 run through a front face 233 of the supporting portion 231 from the rear face 211 and further provide receiving slots 234 opening upwards at the mating portion 232. The base portion 21 further defines a pair of guiding slots 212 disposed at two sides of the extending portion 22 and a receiving portion 213 recessed rearwards from the front face 210. The guiding slots 212 each runs through the front face 210 and the rear face 211, and a supporting face 214 disposed under the extending portion 22 and facing forwards is provided in the receiving portion 213. The extending portion 22 further defines two restricting slots 223 at a bottom face 224 thereof.

Referring to FIG. 2 to FIG. 7, the first set of contacts 3 have five contact members arranged in a row along a transversal direction. Each first contact 3 substantially includes a planar retention portion 31 supported by the base portion 21, an elastic arm 32 extending forwards from the retention portion 31, and a tail portion 33 extending rearwards from the retention portion 31. The elastic arm 32 with a contacting portion 321 at a free end thereof runs through the first receiving groove 24 and exposed beyond the extending portion 22, and the tail portion 33 extends out of the base portion 21. The pair of latching members 7 are disposed in the corresponding guiding slots 212 and each defines a retaining portion 71 retained to the guiding slot 212, a locking arm 72 extending forwardly from the retaining portion 71 and attaching to a side face of the extending portion 22, and a tail portion 73 extending out of the base portion 21. A locking portion 721 provided at a front end of each locking arm 72 extends beyond the front face 221 of the extending portion 22, and the elastic arms 32 of the set of first contacts 3 are disposed between the two locking portions 721.

The second set of contacts 4 have five contact members arranged in a row along the transversal direction. The second set of contacts 4 are arranged into two pairs of signal contacts 40 for transmitting differential signals and a grounding contact 41 disposed between the two pair of signal contacts 40. Each contact 4 includes a planar retention portion 42 retained to the corresponding second receiving groove 25, an elastic arm 43 extending forwards from the retention portion 42, and a tail portion 44 extending rearwards from the retention portion 42. The elastic arm 43 with a contacting portion 431 at a free end thereof runs through the supporting portion 231 in the front-to-back direction and further extends in the receiving slot 234 of the mating portion 232, and the tail portion 44 extends out of the base portion 21.

The optical module 5 includes two lens members 51 arranged in a manner distant from each other and enclosed by a holder member 52. The holder member 52 includes a main portion 520 provided with a plurality of slots 521 opening upwards and rearwards thereon, a cover portion 522 extending rearwards from a lower portion of a rear face 523 of the main portion 520, and a pair of guiding rails 524 disposed at two sides of the main portion 520 and each connected with the main portion 520 at a front end thereof, and a receiving room 53 is provided between the guiding rail 524 and the main portion 520 at two sides of the holder member 52. Each guiding rail 524 further extends rearwards and connects with the cover portion 522 at a middle and lower portion thereof, and a retaining portion 525 extending beyond the cover portion 522 is provided. The main portion 520 further defines a pair of guiding slots 526 recessed rearwards from the front face 527 of the main portion 520, and the lens members 51 are disposed in the guiding rails 524 and protrude towards the front face 527. A pair of guiding posts 528 extends rearwards from the rear face 523 at two side portions thereof. The cover portion 522 defines two separated restricting portions 529 protrude upwards from a top face thereof, and a pair of spring arms 54 extending outwards and rearwards from a rear portion of the cover portion 522. The spring arms 54 are oblique to the front-to-back direction and disposed between the pair of guiding rails 524. Each guiding rail 524 defines a mounting slot 55 opening rearwards and upwards, which has a V-shaped portion at a front portion thereof. Two fibers optic 6 enter into the mounting slots 55 and are retained in the V-shaped portion to couple to the two lens members 51, respectively.

The optical module 5 is movably retained to the housing 2 and disposed in front of the extending portion 21. The two retaining portions 525 enter into the corresponding guiding slots 212 and run through the guiding slots 212, and the spring arms 54 run into the receiving portion 213 and abut against the supporting face 214. The guiding posts 528 are aligned and received in the receiving slots 222 recessed from the front face 221 of the extending portion 22, moreover, the guiding post 528 can move along the receiving slots 222 in the front-to-back direction. The restricting portions 529 protrude into the restricting slots 223 and movably received and restricted therein. The elastic arms 32 of the first set of contacts 3 are received in the corresponding slots 521 of the main portion 520, and the locking arms 72 are received in the receiving rooms 53. The optical module 5 is assembled to the extending portion 22 to provide a tongue portion A together with the extending portion 22, and the optical module 5 is defined as a mating portion of the tongue portion A, and the front face 527 of the optical module 5 extends past a front face of the tongue portion 23.

The metal shell includes a first shield part 81 and a second shield part 82. The first shield part 81 includes two front tube-shaped mating frames 811, 812, and a rear U-shaped body section 813 connected to a top side of the mating frames 811, 812. The body section 813 has two window portions 814, 815 disposed in each side piece thereof. The second shield part 82 includes an inverted U-shaped body section 821, and a cable holder member 822 attached to a bottom side of the body section 821. The body section 821 has two elastic pieces 823 punched upwards from the bottom side thereof, and each side piece defines a window portion 824 at a front portion thereof and a protrusion piece 825 disposed behind the window portion 824.

The insulative housing 2 is assembled to the first shield part 81, with the extending portion 22 together with the optical module 5 enclosed in the mating frame 811 and the tongue portion 23 enclosed in the mating frame 812, the locking protrusion 20 projecting outwards from each sidewall of the base portion 21 locks into the window portion 814. The second shield part 82 is assembled to the first shield part 81, with the window portions 824 locked by the locking protrusions 20 and the body sections 813, 821 combined together.

Figure 8:
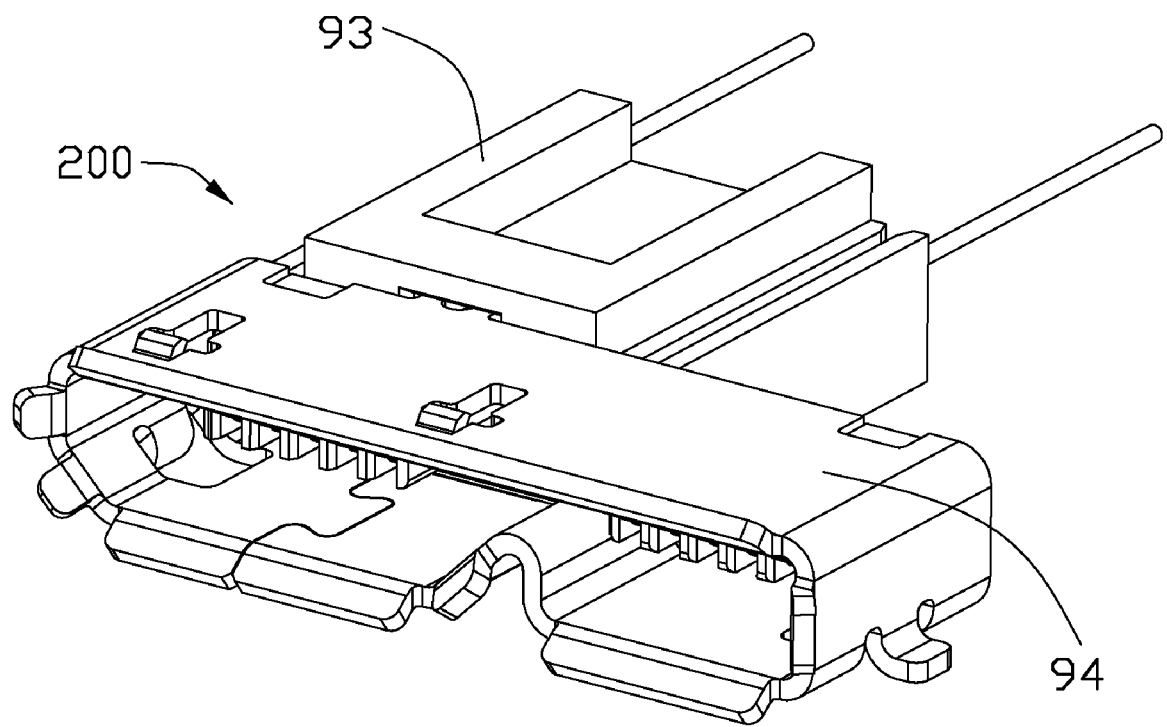
FIG. 8 is an assembled, perspective view of an optoelectronic receptacle connector assembly for mating with the optoelectronic cable assembly shown in FIG. 1.
Figure 9:
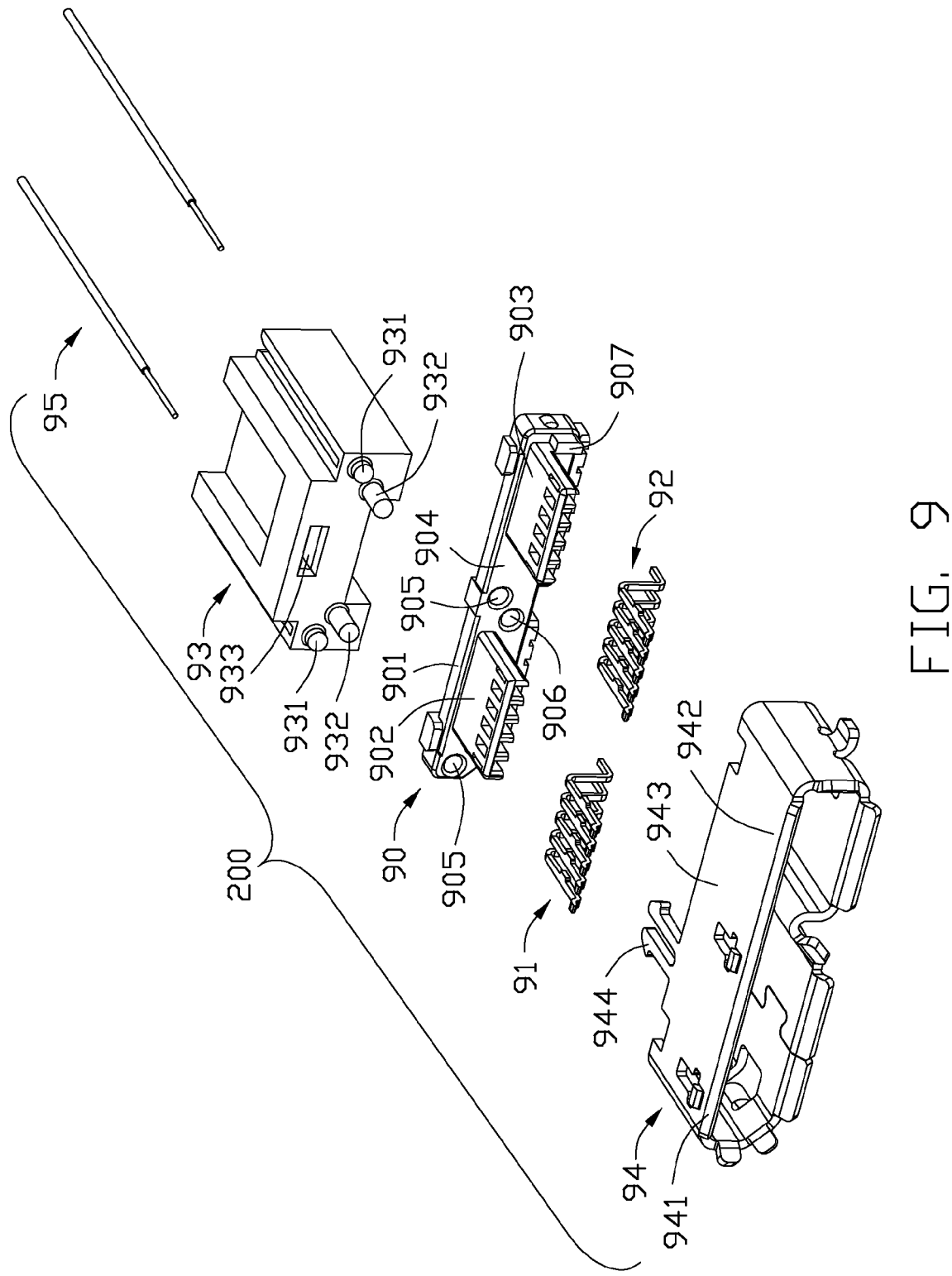
FIG. 9 is an exploded perspective view of the optoelectronic receptacle connector assembly shown in FIG. 8.
Figure 10:
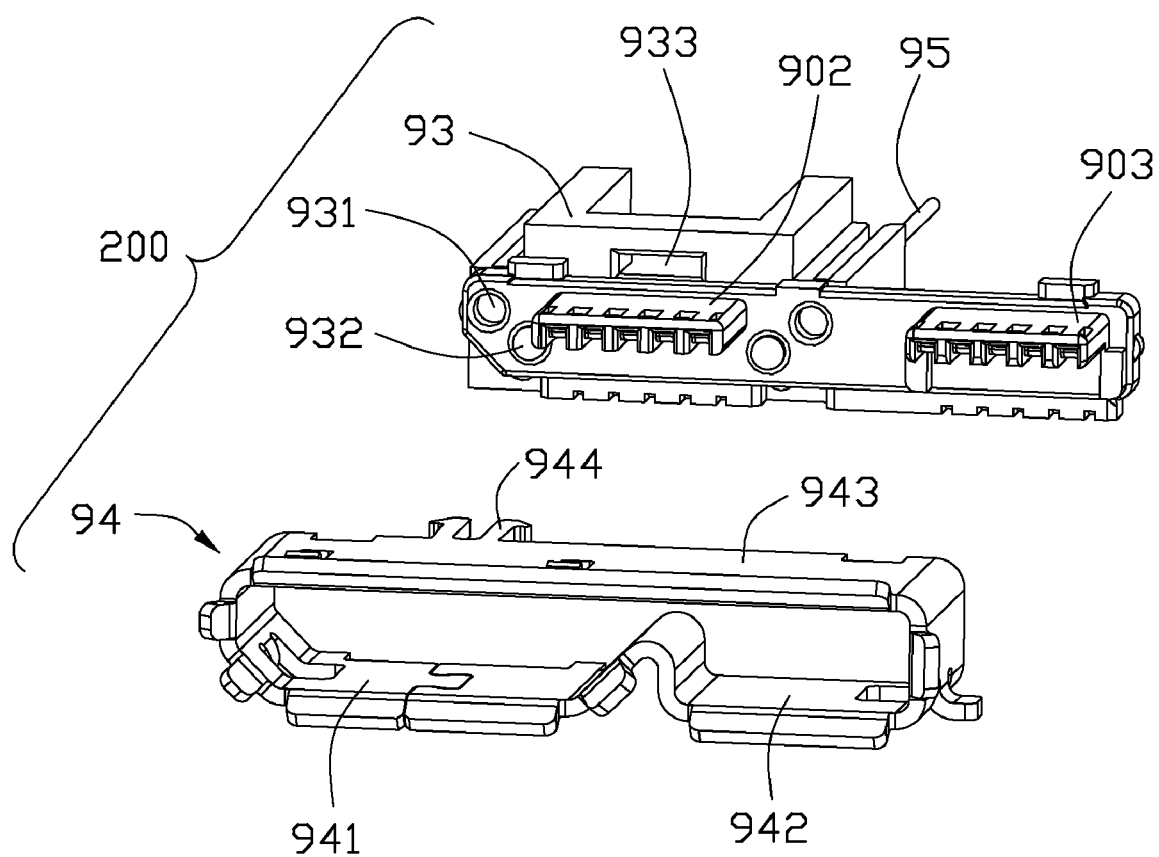
FIG. 10 is a partly exploded perspective view of the optoelectronic receptacle connector assembly shown in FIG. 8, and shows a second shell separated from a second housing.
Figure 11:
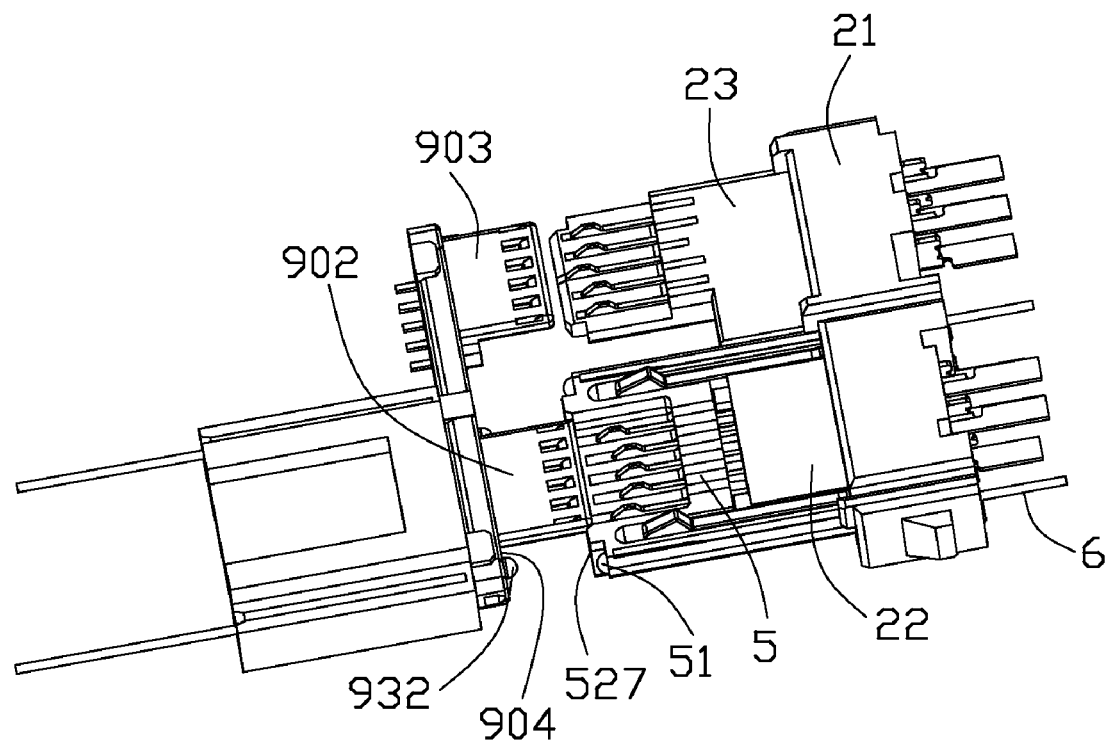
FIGS. 11-13 are perspective views of the optoelectronic cable assembly with the shield parts removed mating with the optoelectronic receptacle connector assembly without the second shell, and the FIG. 11 shows the optoelectronic cable assembly started to contact the optoelectronic receptacle connector assembly, the FIG. 12 shows the optoelectronic cable assembly mated with the optoelectronic receptacle connector assembly, and the FIG. 13 shows the optoelectronic cable assembly completely mated with the optoelectronic receptacle connector assembly.
Figure 12:
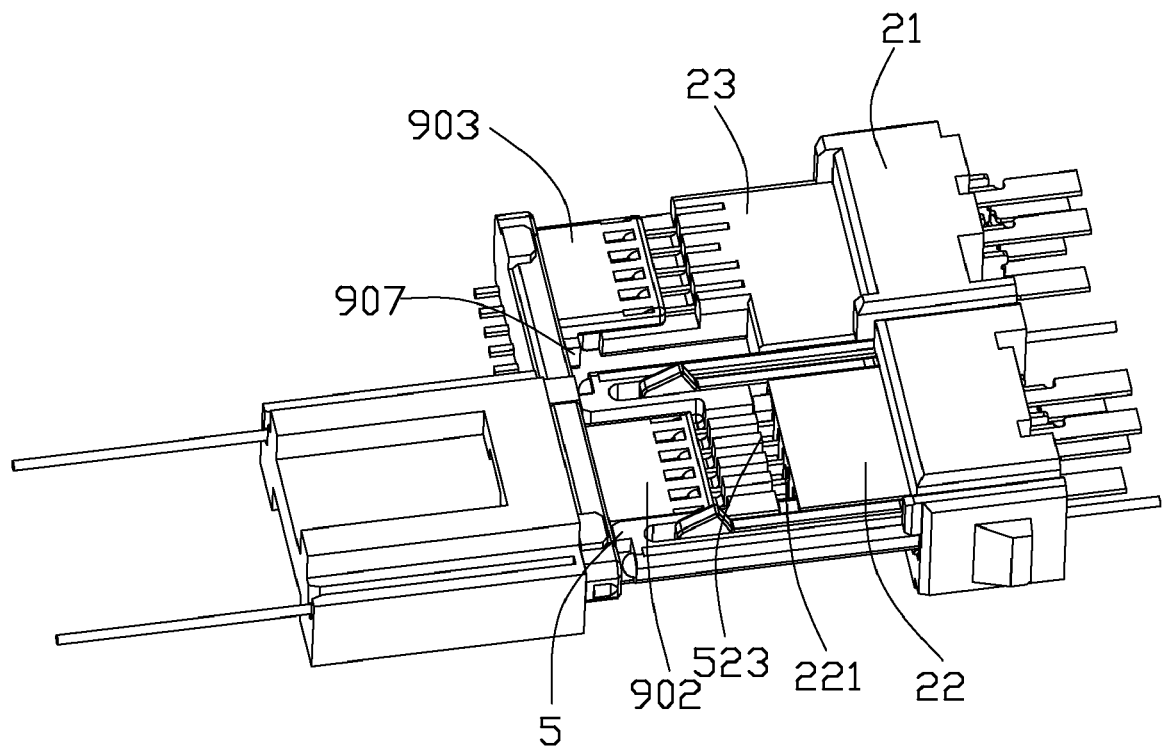
Figure 13:
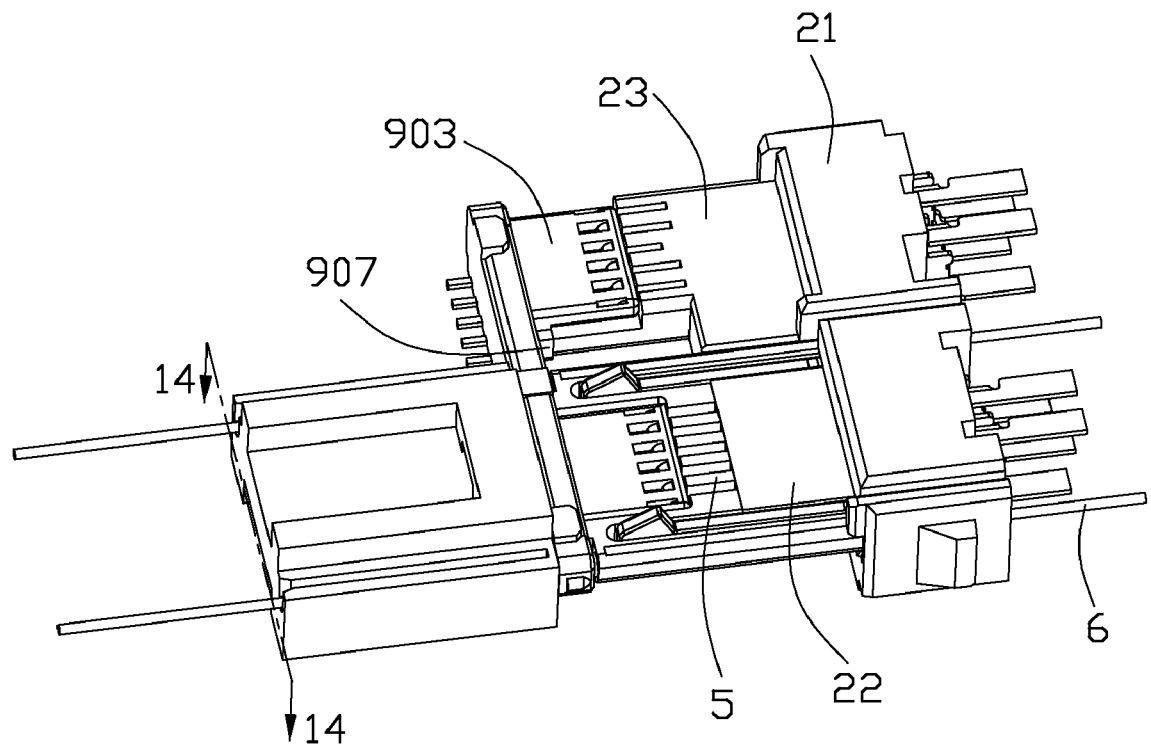
Figure 14:
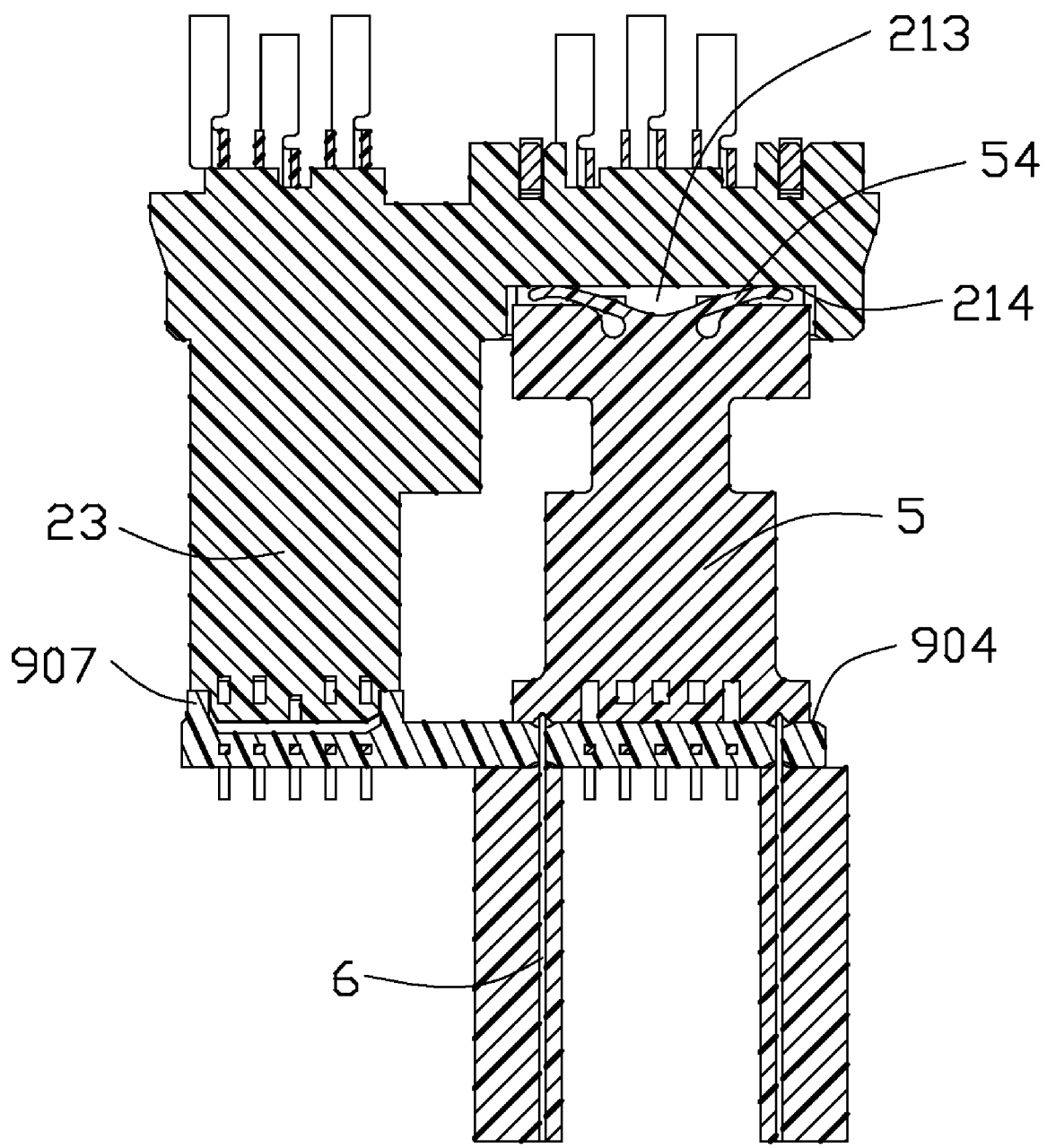
FIG. 14 is a cross sectional view taken along line 14-14 of FIG. 13, and shows the spring arms in a deflected state.
Figure 15:
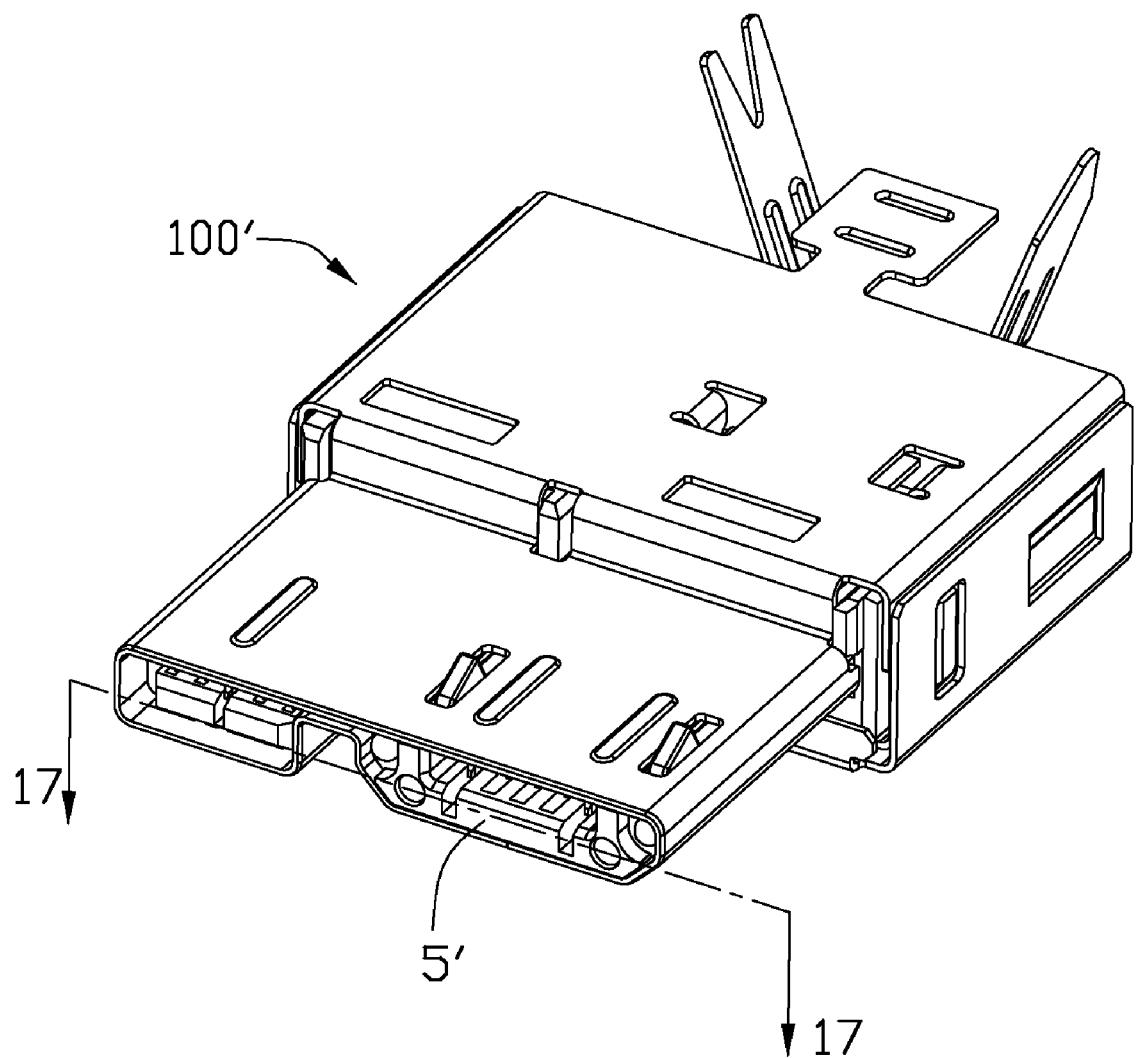
FIG. 15 is a perspective view of the optoelectronic cable assembly in accordance with a second embodiment of the present invention.
Figure 16:
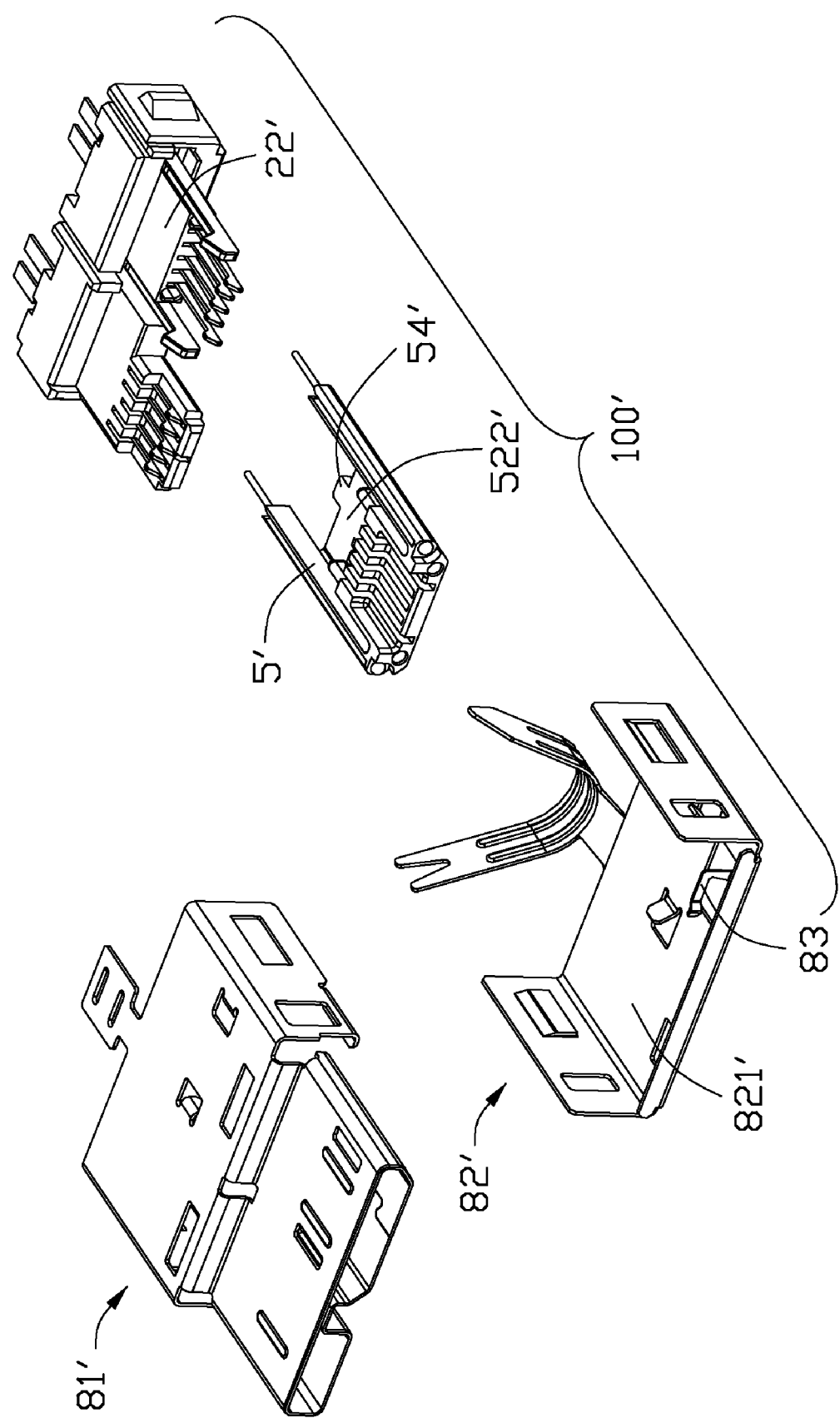
FIG. 16 is a partly exploded perspective view of the optoelectronic cable assembly and shows an optical module, a first shield part and a second shield part separated from an housing shown in FIG. 15.
Figure 17:
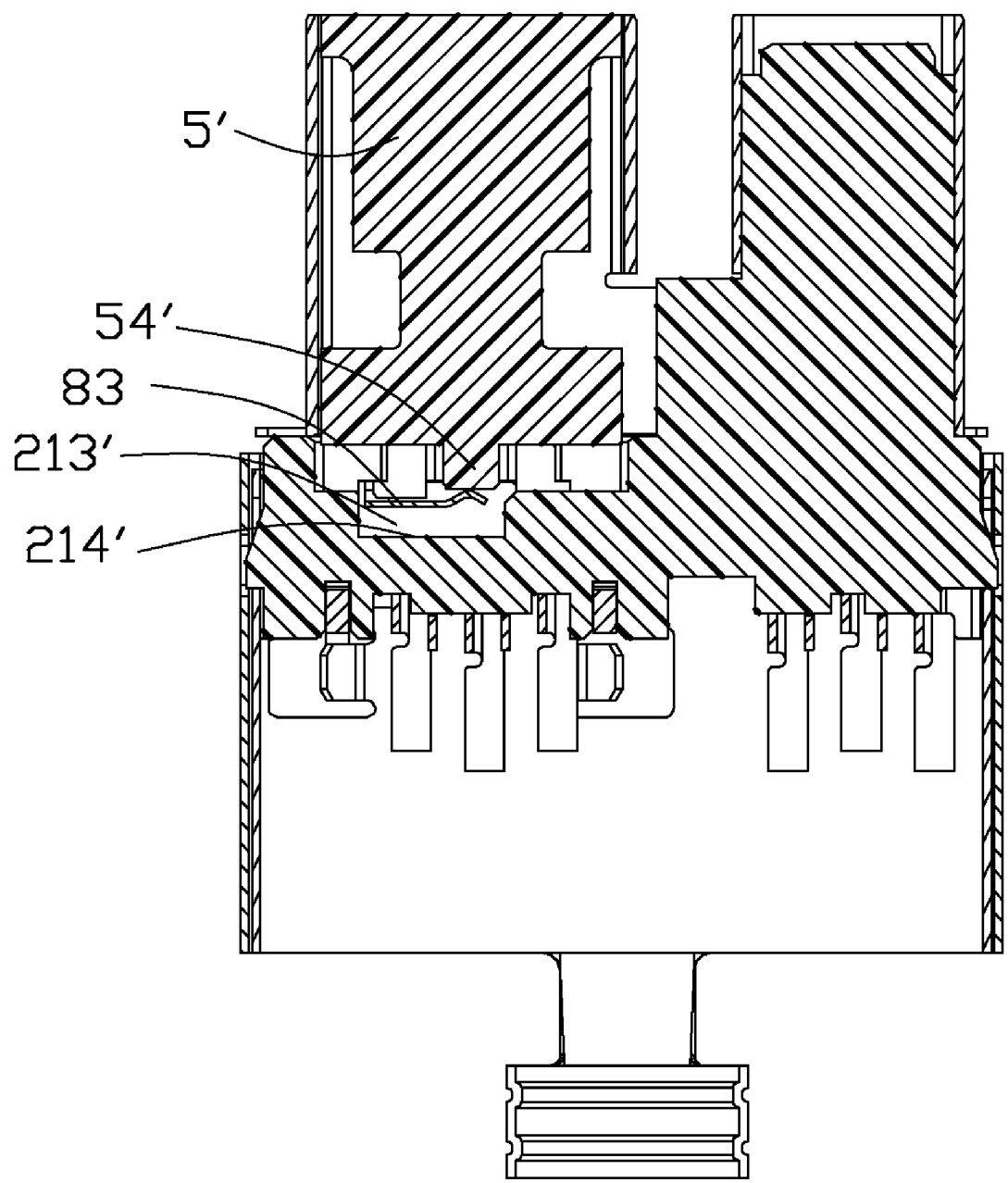
FIGS. 17, 18 are cross sectional views taken along line 17-17 of FIG. 15, and the FIG. 17 shows a spring piece situated in a non-mating state and attaching to a stopper portion, the FIG. 18 shows the spring piece deflected under a mating force F.
Figure 18:
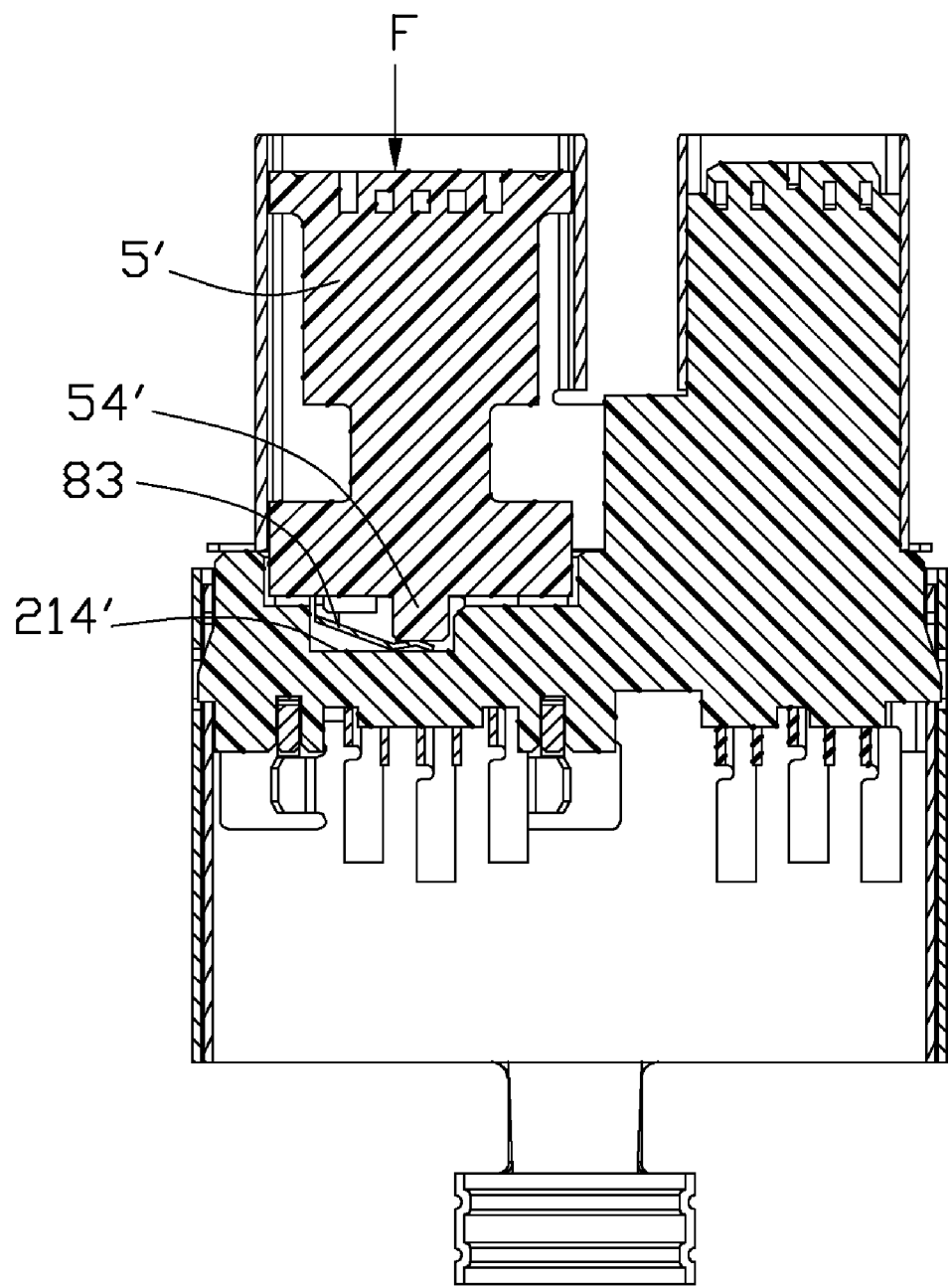

FIG. 8 to FIG. 10 discloses an optoelectronic receptacle connector assembly 200 for mating with the optoelectronic cable assembly 100. The optoelectronic receptacle connector assembly 200 includes a second insulative housing 90, a set of third contacts 91, a set of fourth contacts 92, a second optical module 93 retained to the second housing 90 and a second shell 94 surrounding the second housing 90, and two second fibers optic 95 retained to the second optical module 93.

Referring to FIG. 9 and FIG. 10, the second housing 90 defines a body portion 901 and a pair of mating tongues 902, 903 extending from a mating face 904 thereof. The set of third contacts 91 are retained to the first mating tongue 902 for mating with the tongue portion A, and the set of fourth contacts 92 are retained to the second mating tongue 902 for mating with the tongue portion 23. The body portion 901 further defines a pair of receiving holes 905 separately disposed at two sides of the first mating tongue 902, a pair of retaining holes 906 separately disposed below the first mating tongue 902, and a pair of blocking portions 907 disposed below the second mating tongue 903. The receiving holes 905 and retaining holes 906 run through the mating face 904 thereof, and the blocking portions 907 project out of the mating face 904.

The second optical module 93 defines two lens members 931 received in the receiving holes 905, and a pair of positioning posts 932 running through the retaining holes 906 and projecting out of the mating face 904. The two second fibers optic 95 are retained to the second optical module 93 to couple to the two lens members 931, respectively. The second shell 94 defines two tube-shaped mating frames 941, 942, and the second housing 90 is assembled to the second shell 94 with the first mating tongue 902 enclosed in the mating frame 941, and the second mating tongue 902 enclosed in the mating frame 942. The hook portions 944 extending from the top piece 943 of the second shell 94 run towards the second optical module 93 and into a retaining slot 933 disposed at a upper middle portion of the second optical module 93, which can retain the second optical module 93 to the second housing 90 steadily.

Referring to FIG. 1 to FIG. 14, when the optoelectronic cable assembly 100 without the shield parts 81, 82 mates with the optoelectronic receptacle connector assembly 200 with the second shell 94 removed, the first mating tongue 902 firstly contact the optical module 5, and then the contacts 91 mate with the contacting portions 321 of the first set of contacts 3 and the second mating tongue 903 mates with the tongue portion 23 until the front face 527 abutting against the mating face 904. The positioning posts 932 run into the corresponding guiding slots 526, and the lens members 51 disposed in the optical module 5 are aligned with the lens members 931 disposed in the second optical module 93. The tongue portion 23 is spaced from the blocking portions 907, and the rear face 523 of the optical module 5 is spaced from the front face 221 of the extending portion 22. During further mating, the optical module 5 is pushed backwardly by the mating face 904, and the spring arms 54 are deflected to make the optical module 5 to move rearwards until the tongue portion 23 abutting against the blocking portions 907 and the rear face 523 abutting against the front face 221.

When both mated completely, the deflectable spring arms 54 can deflect the optical module 5 forwardly movement along a mating direction. As the two spring arms 54 are spaced apart from each other along the transversal direction, therefore they can provide a balanced force onto the optical module 5, and no tilting problem occurs during the optical module 5 moving along the mating direction. The optical module 5, which is defined as a part of the tongue portion A, is floatable with regard to the extending portion 22, which can be accurately aligned with, and optically coupled to counterparts, if there are some errors in manufacturing process.

FIG. 15 to FIG. 18 discloses a second embodiment of the present invention. The optoelectronic cable assembly 100' has the similar construct with the cable assembly 100 except that the optical module 5' provides a stopper portion 54' extending rearwards from the cover portion 522' thereof instead of the spring arms 54. The metal shell includes a first shield part 81' and a second shield part 82', and the second shield part 82' further provides a spring piece 83 projecting upwards from the body section 821'. The spring piece 83 is defined as an L-shaped configuration and attaches to a rear portion of the stopper portion 54'. When the optoelectronic cable assembly 100' mates with an optoelectronic receptacle connector (not shown), and the optical module 5' moves backwardly by reverse pushing force F exerted by its counterpart member (not shown), and the optical module 5' pushes the spring piece 83 to move in the receiving portion 213' and abut against the supporting face 214'. When the force F is withdrawn, the spring piece 83 can deflect the optical module 5' forwardly movement. The optical module 5' is moveable with regard to the extending portion 22'.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An optoelectronic cable assembly, comprising:
   an insulative housing defining a base portion and an extending portion extending forwards from the base portion;
   a set of contacts each defining a retention portion retained in the base portion, an elastic arm running through the extending portion and exposed beyond the extending portion and a tail portion extending out of the base portion;
   an optical module disposed in front of the extending portion to receive the elastic arms therein, and capable of moving along a front-to-back direction with regard to the extending portion; and
   at least one fiber optic coupled to the optical module.

2. The optoelectronic cable assembly as described in claim 1, wherein a tongue portion is defined jointly by the optical module and the extending portion while the optical module interface optically and electrically with respect to a mated optoelectronic connector.

3. The optoelectronic cable assembly as described in claim 1, wherein the optical module defines at least one spring arm abutting against a supporting face of the base portion.

4. The optoelectronic cable assembly as described in claim 1, further comprising a metal shell which defines at least one spring piece projecting from a body section thereof, and the optical module defines at least one stopper portion abutting against the at least one spring piece.

5. The optoelectronic cable assembly as described in claim 3, wherein the base portion defines a front face thereof, and the extending portion extends forwards from the front face, the base portion further defines a receiving portion recessed rearwards from the front face and the supporting face is disposed in the receiving portion.

6. The optoelectronic cable assembly as described in claim 5, wherein the optical module defines a pair of guiding rails movably received in the base portion.

7. The optoelectronic cable assembly as described in claim 6, wherein the optical module defines a main portion and a cover portion extending rearwards from the main portion, and the elastic arms are received in the main portion, and the at least one spring arm extends from the cover portion and disposed below the extending portion.

8. The optoelectronic cable assembly as described in claim 7, wherein the guiding rails are disposed at two sides of the main portion and each connects the main portion at a front portion thereof, and a receiving room is provided between the guiding rail and the main portion.

9. The optoelectronic cable assembly as described in claim 8, wherein the guiding rails each connects the cover portion at a middle portion thereof, and a retaining portion is provided at a free rear end thereof.

10. The optoelectronic cable assembly as described in claim 9, wherein the base portion defines a pair of guiding slots disposed at two sides of the extending portion, and the retaining portions each runs through the guiding slot.

11. The optoelectronic cable assembly as described in claim 10, wherein the cover portion defines at least one restricting portion coupled with the extending portion to make the optical module to be movably retained to the extending portion.

12. The optoelectronic cable assembly as described in claim 11, wherein the at least one fiber optic is retained in the guiding rail.

13. The optoelectronic cable assembly as described in claim 12, further comprising a pair of latching members each retained in the guiding slot and sandwiched by the extending portion and the guiding rail, and the latching members each extends into the receiving room.

14. The optoelectronic cable assembly as described in claim 13, wherein the base portion further defines another tongue portion extending forwards from the front face and disposed in side-by-side manner with the extending portion, and a set of second contacts are retained in the tongue portion.

15. An optoelectronic receptacle connector assembly for mating with the optoelectronic cable assembly as described in claim 1, comprising:
   a second insulative housing defining a body portion and a mating tongue extending from a mating face of the body portion;
   a set of contacts retained in the body portion and each providing a contacting portion exposed on the mating tongue;
   a second optical module steadily retained to the body portion; and
   at least one second fiber optic coupled to the second optical module.

16. The optoelectronic receptacle connector assembly as described in claim 15, wherein the body portion defines at least one receiving hole running through the mating face thereof, and a lens member of the second optical module is received in the receiving hole.

17. The optoelectronic receptacle connector assembly as described in claim 16, further comprising a second shell, which defines a hook portion locking into the second optical module.

18. An optoelectronic connector comprising:
   an insulative housing defining a base portion;
   a plurality of contacts retained to the base portion with contacting sections extending forwardly beyond the base portion; and an optical module positioned in front of said base, back and forth moveable relative to the base portion in a front-to-back direction and intermixed with said contacting sections in a transverse direction perpendicular to said front-to-back direction; wherein said optical module is equipped with at least one optic fiber for coupling to another optical device on a complementary connector having terminals engaged with the contacts during mating with said complementary connector.

19. The optoelectronic connector as claimed in claim 18, wherein said optical module is equipped with a resilient device to constantly urge said optical module forwardly away from the base portion so as to be resiliently coupled to said another optical device during mating with said complementary connector.

20. The optoelectronic connector as claimed in claim 18, wherein said optical module is an insulative piece and defines a plurality of grooves to receive the contacting sections, respectively, under condition that a back-and-forth movement of the optical module in said front-to-back direction results in a relative movement between the optical module and the contacting sections in said front-to-back direction.

* * * * *